C. J. Tripp.

Flour Sifter.

Nº 96,055.

Patented Oct. 19, 1869.

Witnesses
John A. Shumway
A. S. Libbits

Inventor.
Charles J. Tripp
By his Attorney
John E. Earle

United States Patent Office.

CHARLES J. TRIPP, OF WALLINGFORD, CONNECTICUT.

Letters Patent No. 96,055, dated October 19, 1869.

IMPROVED FLOUR-SIFTER.

The Schedule referred to in these Letters Patent and making part of the same.

*To all whom it may concern:*

Be it known that I, CHARLES J. TRIPP, of Wallingford, in the county of New Haven, and State of Connecticut, have invented a new Improvement in Flour-Sifters; and I do hereby declare the following, when taken in connection with the accompanying drawings, and the letters of reference marked thereon, to be a full, clear, and exact description of the same, and which said drawings constitute part of this specification, and represent, in—

Figure 1:
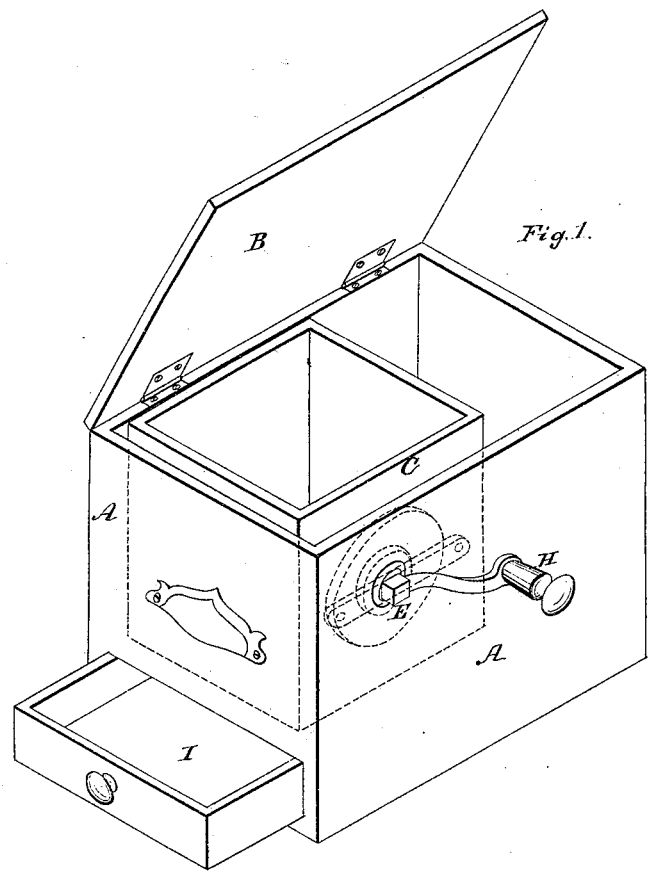

Figure 1, a perspective view, and in

Figure 2:
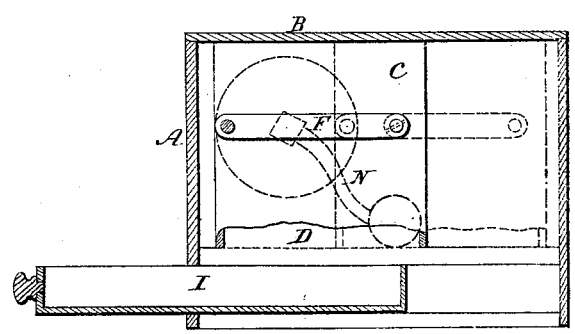

Figure 2, a vertical central section.

This invention relates to an improvement in device for sifting flour.

In sifters, as heretofore constructed, after the requisite quantity of flour has been sifted, the machine itself must be removed, and generally the unsifted flour emptied out.

The object of my invention is to construct a flour-sifter which may be filled with flour, and as small a portion as desired be sifted, and the balance remain covered in the sifter, and combining with the sifter a receptacle for the sifted flour, by means of which it may be removed from the machine without in any way interfering with the unsifted flour.

To enable others to construct and use my improvement, I will proceed to describe the same, as illustrated in the accompanying drawings.

A is the case, constructed of wood or other suitable material, and of a size corresponding to the general use for which the sifter is designed. It is provided with a cover, B, to close the top, and within the case is arranged, on suitable slides, a box, C, its bottom, D, being formed of a net-work of wire, or perforated, as seen in fig. 2, the meshes or perforations being of the proper size for sifting the flour which is to be placed within the box C. Though the side of the box a crank-shaft, E, extends, to which a connecting-rod or pitman, F, is attached, connecting the crank of the shaft with the box, as seen in fig. 2, so that by turning the crank H upon the outside, a reciprocating movement will be given to the box C, causing it to pass to and fro longitudinally in the case, which motion agitates the flour so as to pass through the meshes in the bottom.

Beneath the box C, I arrange a drawer, I, which, during the operation of sifting, is placed entirely under the box until the requisite quantity of sifted flour has passed thereinto; then the drawer may be taken out and the flour removed, and the drawer replaced for further sifting when required.

I do not wish to be understood as broadly claiming the arrangement of a reciprocating sieve within a box, as such, I am aware, is not new.

Having fully described my invention,

What I claim as new and useful, and desire to secure by Letters Patent, is—

The combination of the case A, with its cover B and receptacle I, inner box C, with the crank-shaft E, arranged with a crank and connecting-rod F upon the inside of the case, attached to the box C, and the crank N outside, all constructed and arranged in the manner herein set forth.

CHARLES J. X TRIPP.
his mark.

Witnesses:
A. J. TIBBITS,
J. H. SHUMWAY.